July 26, 1949.  C. J. SMITH  2,477,270

BEARING REPLACER TOOL

Filed Sept. 18, 1945

INVENTOR.
COY J. SMITH
BY
A.B.Bowman
ATTORNEY

Patented July 26, 1949

2,477,270

UNITED STATES PATENT OFFICE 2,477,270

BEARING REPLACER TOOL

Coy J. Smith, San Diego, Calif.

Application September 18, 1945, Serial No. 617,098

3 Claims. (Cl. 29—257)

My invention relates to a bearing replacer tool more particularly for removing and inserting press fit bearings in various machine parts and the objects of my invention are:

First: To provide a bearing replacer tool of this class which is small and compact and which permits portability of the same for replacing bearings in connection with assembled machinery.

Second: To provide a bearing replacer tool of this class which securely holds the new bearing in proper alignment with the hole in which it is to be pressed preliminary to the fitting of the same which is accomplished by striking a plunger in engagement with said bearing with a soft instrument.

Third: To provide a bearing replacer tool of this class in which a replaceable pilot is readily inserted for engagement with various sized bearings.

Fourth: To provide a tool of this class in which spring tension holds the new bearing securely in position adjacent the part in which the bearing is to be inserted preliminary to fitting the same so that the operator may determine proper alignment of the bearing before insertion of the same.

Fifth: To provide a tool of this class which very quickly removes bearings and replaces the same with substantially the same mode of operation.

Sixth: To provide a bearing replacer tool of this class which is entirely manually operated and does not require hydraulic or other similar leverage means.

Seventh: To provide a tool of this class which is very simple and economical of construction, efficient in its action, and which will not readily deteriorate or get out of order.

Figure 1:
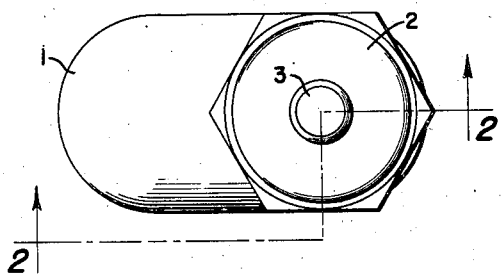
Figure 2:
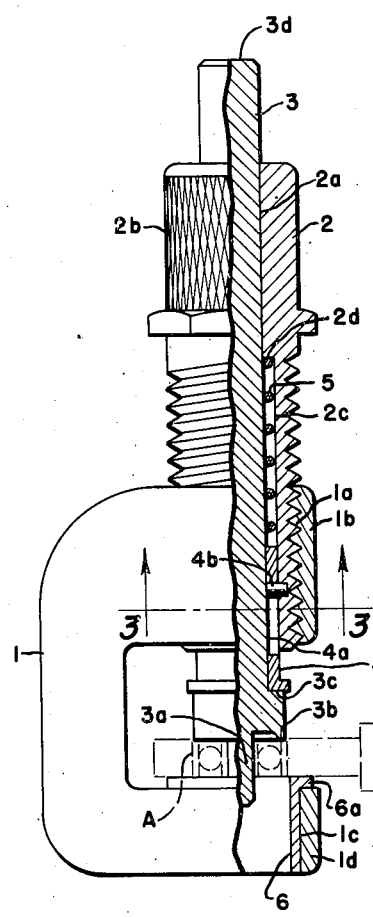
Figure 3:
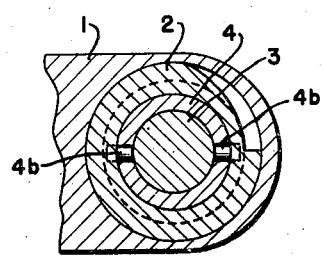

With these and other objects in view as will appear hereinafter my invention consists of certain novel features of construction, combination and arrangement of parts and portions as will be hereinafter described in detail and particularly set forth in the appended claims, reference being had to the accompanying drawing and to the characters of reference thereon forming a part of this application in which:

Fig. 1 is an end view of my bearing replacer tool. Fig. 2 is a partial vertical sectional view taken from the line 2—2 on Fig. 1 and Fig. 3 is a fragmentary sectional view taken from the line 3—3 of Fig. 2.

Similar characters of reference refer to similar parts and portions throughout the several views of the drawing.

The frame 1, sleeve 2, plunger 3, collar 4, spring 5 and the bushing 6 constitute the principal parts and portions of my bearing replacer tool.

The frame 1 is U-shaped as shown in Fig. 2 of the drawing and is provided with an internally screw threaded opening 1a in one leg portion 1b thereof aligning with opening 1c in the opposite leg portion 1d thereof. Screw threaded in the opening 1a is the sleeve 2 provided with an internal bore 2a in which the plunger 3 is reciprocally mounted. The outer end portion of the sleeve 2 is provided with a knurled portion 2b arranged for use in manually adjusting sleeve 2 in the frame 1 in connection with the screw threaded portion 1a thereof. Reciprocally mounted in the sleeve 2 around the plunger 3 is the collar 4. This collar 4 is provided with opposed slotted portions 4a in opposite sidewalls thereof engaged by pins 4b secured in the sidewall portion of the sleeve 2 all as shown best in Fig. 3 of the drawing. Thus the longitudinal movement of the collar 4 is limited by the end of the slotted portion 4a in engagement with the pins 4b. The spring 5 is positioned in the enlarged bore portion 2c of the sleeve 2 above the collar 4 and the spring 5 abuts the shoulder portions 2d in the sleeve 2 tends to force the collar 4 outwardly of the bore portion 2c into engagement with the pins 4b in the ends of the slotted portions 4a. The plunger 3 extends beyond the outer end of the sleeve 2 and is provided with a bearing pilot portion 3a at its opposite end which is arranged to fit the internal bore of a bearing. This pilot portion 3a is provided with an integral peripheral engaging portion 3b adapted to engage the bearing A as indicated by dash lines in Fig. 2 of the drawing near its periphery for forcing the same into the fixture B as shown by dash lines in Fig. 2 of the drawing. It will be here noted that this pilot portion 3a and peripheral engaging portion 3b may be varied to fit bearings of different diameters. Several of the plungers 3 may be provided for use in replacing different standard bearings. It will be noted that the plunger 3 is provided with a shoulder portion 3c engaged by the collar 4 imposing thrust of the spring 5 on said shoulder portion 3c for holding the pilot portion 3a and peripheral engaging portion 3b in engagement with bearings to be removed or inserted in fixtures such as fixture B indicated by dash lines in Fig. 2 of the drawing. The bushing 6 as shown in Fig. 2 of the drawing is an annular bushing having a shoulder portion 6a engaging the inner side of the leg portion 1b of the frame 1. The diameter dimensions of this bushing 6 may be varied to accommodate the fixture B for closely surrounding various size bearings being replaced. The internal bore of this bushing 6 corresponds to the diameter of the peripheral engaging portion 3b of the plunger 3 so that said plunger 3 is readily removable through the bore portion of the bushing 6. Thus set up for various size bearings is quickly accomplished, by changing the bushing 6 and the plunger 3 in accordance with the diameter of the bearing being operated upon. It will be here noted that the plunger 3 may be provided with a pilot and bearing peripheral engaging portion arranged in screw threaded connected relation therewith if desired.

The operation of my bearing replacement tool is substantially as follows:

When the fixture B is inserted between the leg portions 1b and 1c of the U-shaped frame 1, the old bearing is first removed by placing the pilot portion 3a in engagement with the internal bore of the bearing A and engaging the peripheral engaging portion 3b with the one side of the bearing A then the knurled portion 2b of the sleeve 2 is grasped and the sleeve 2 is rotated in a clockwise direction imposing compression of the spring 5 against the collar 4 which is in engagement with the shoulder portion 3c of the plunger 3. As the sleeve 2 passes inwardly in screw threaded relation with the frame 1 the pins 4b traverse the slotted portion 4a of the collar 4 and pressure is imposed by the spring on the bearing A maintaining snug engagement of the peripheral engaging portion 3b and the pilot 3a with the bearing A. The end portion 3d of the plunger 3 is then struck by a resilient member such as a rawhide hammer. As the end portion 3d of the plunger 3 is so struck the bearing A is forced out of the fixture B through the bushing 6 whereby the bearing A is completely removed from the fixture B. It will be here noted that the bushing 6 engages the fixture B around the periphery of the bearing A and supports the fixture B against the compression of the spring 5 imposed on the collar 4 and transferred thereby to the peripheral engaging portion 3b in connection with the bearing A.

When replacing the new bearing A the sleeve 2 is rotated in the opposite direction in screw threaded relation with the frame 1 retracting the collar 4 permitting the plunger 3 to be moved outwardly whereby the pilot 3a may be fitted with the new bearing at one side of the fixture B. When the bearing is fitted over the pilot portion 3a the sleeve 2 is again rotated in clockwise direction in screw threaded relation with the frame 1 moving the pilot and the bearing inwardly toward the fixture B in engagement with the bushing 6. When the bearing A engages the fixture B and is aligned precisely with the fixture B the sleeve 2 is further rotated to impose compression of the spring 5 for snug engagement of the bearing and the fixture B before the plunger end portion 3d is struck with the resilient rawhide or other hammer. When inserting new bearings in fixture B care must be taken in striking the plunger 3 so that the new bearing is inserted in flush relation with the side portions of the fixture B.

Though I have shown a particular construction, combination and arrangement of parts and portions, I do not wish to be limited to the particular construction, combination and arrangement but desire to include in the scope of my invention the construction, combination and arrangement substantially as set forth in the appended claims.

Having thus described my invention what I claim as new and desire to secure by Letters Patent is:

1. In a bearing replacer tool a combination of a U-shaped frame having a screw threaded opening extending laterally through one leg thereof, the other leg of said U-shaped frame having an opening therein aligned with said screw threaded opening, an externally screw threaded sleeve arranged in screw threaded relation with said frame in said screw threaded opening provided with a bore therethrough, including a reduced diameter portion and an enlarged diameter portion, a plunger reciprocally mounted in said reduced diameter portion, a spring around said plunger in said enlarged diameter portion, a collar around said plunger in said enlarged diameter portion, engaged at one end by said spring and protruding from said sleeve at its opposite end, said collar provided with a slotted portion in the sidewall thereof and pins in said sleeve extending through said slotted portions of said collar arranged to retain said collar in connection with said sleeve.

2. In a bearing replacer tool a combination of a U-shaped frame having a screw threaded opening extending laterally through one leg thereof, the other leg of said U-shaped frame having an opening therein aligned with said screw threaded opening, an externally screw threaded sleeve arranged in screw threaded relation with said frame in said screw threaded opening provided with a bore therethrough, including a reduced diameter portion and an enlarged diameter portion, a plunger reciprocally mounted in said reduced diameter portion, a spring around said plunger in said enlarged diameter portion, a collar around said plunger in said enlarged diameter portion engaged at one end by said spring and protruding from said sleeve at its opposite end, said collar provided with a slotted portion in the sidewall thereof and pins in said sleeve extending through said slotted portions of said collar arranged to retain said collar in connection with said sleeve, said plunger provided with a shoulder portion engageable with said collar portion and a concentric pilot portion engageable with bearing to be replaced, said plunger also provided with a peripheral engaging portion outwardly of said pilot portion for engaging bearings near the periphery thereof.

3. In a bearing replacer tool a combination of a U-shaped frame having a screw threaded opening extending laterally through one leg thereof, the other leg of said U-shaped frame having an opening therein aligned with said screw threaded opening, an externally screw threaded sleeve arranged in screw threaded relation with said frame in said screw threaded opening provided with a bore therethrough, including a reduced diameter portion and an enlarged diameter portion, a plunger reciprocally mounted in said reduced diameter portion, a spring around said plunger in said enlarged diameter portion, a collar around said plunger in said enlarged diameter portion engaged at one end by said spring and protruding from said sleeve at its opposite end, said collar provided with a slotted portion in the sidewall thereof and pins in said sleeve extending through said slotted portions of said collar arranged to retain said collar in connection with said sleeve, said plunger provided with a shoulder portion engageable with said collar portion and a concentric pilot portion engageable with bearing to be replaced, said plunger also provided with a peripheral engaging portion outwardly of said pilot portion for engaging bearings near the periphery thereof, a replaceable bushing having a bore adapted to surround bearings placed thereover in the opening to one leg of said frame opposed from the opposite leg in which said sleeve is connected.

COY J. SMITH.

REFERENCES CITED

The following references are of record in the file of this patent:

UNITED STATES PATENTS

| Number | Name | Date |
|---|---|---|
| 512,381 | Keyes | Jan. 9, 1894 |
| 892,309 | Russell | June 30, 1908 |
| 957,228 | Mann | May 10, 1910 |
| 1,567,192 | Richardson | Dec. 29, 1925 |
| 1,999,537 | Fisher | Apr. 30, 1935 |
| 2,215,015 | Richard | Sept. 17, 1940 |

FOREIGN PATENTS

| Number | Country | Date |
|---|---|---|
| 311,712 | Germany | Apr. 7, 1919 |